(12) United States Patent
Kuck et al.

(10) Patent No.: US 7,614,045 B2
(45) Date of Patent: Nov. 3, 2009

(54) SHARING CLASSES AND CLASS LOADERS

(75) Inventors: Norbert Kuck, Karlsruhe (DE); Oliver Schmidt, Worth am Rhein (DE); Ralf Schmelter, Wiesloch (DE)

(73) Assignee: SAP (AG), Walldorf (DE)

( * ) Notice: Subject to any disclaimer, the term of this patent is extended or adjusted under 35 U.S.C. 154(b) by 778 days.

(21) Appl. No.: 10/949,936

(22) Filed: Sep. 24, 2004

(65) Prior Publication Data

US 2006/0070051 A1    Mar. 30, 2006

(51) Int. Cl.
G06F 9/44    (2006.01)
(52) U.S. Cl. .................... 717/166; 717/162; 717/164
(58) Field of Classification Search .................. None
See application file for complete search history.

(56) References Cited

U.S. PATENT DOCUMENTS 6,519,594 B1 *    2/2003    Li .................... 707/10
6,738,977 B1    5/2004    Berry et al.

OTHER PUBLICATIONS

Liang et al, Dynamic Class loading in the Java Virtual Machine, ACM Sigplan Notices, vol. 33 Issue 10, pp. 36-44, 1998. [retrieved on Jun. 10, 2009] Retrieved from the Internet: URL<http://delivery.acm.org/10.1145/290000/286945/p36-liang.pdf?key1=286945 &key2=8333464421&coll=GUIDE&dl=GUIDE &CFID=39946987&CFTOKEN=65766857.*

Czajkowski, Grzegorz, Application Isolation in the Java Virtual Machine, pp. 354-366, 2000. [retrived on Jun. 10, 2009] Retrieved from the Internet: URL<http://delivery.acm.org/10.1145/360000/353195/p354-czajkowski.pdf?key1=353195&key2=2683464421 &coll=GUIDE&dl=GUIDE&CFID=39948108 &CFTOKEN=29667095.*

Krause et al; Safe Class Sharing Among Java Processes; Research Report RZ3230, Apr. 24, 2000, pp. 1-14, XP002231106.

Czajkowski et al; Multitasking Without Compromise: A Virtual Machine Evolution; ACM SIGPLAN Notices, ACM, Association for Computer Machinery, New York, NY, US, vol. 36, No. 11, Nov. 14, 2001, pp. 125-138, XP008050761.

(Continued)

Primary Examiner—Tuan Q Dam
Assistant Examiner—Cheneca P Smith
(74) Attorney, Agent, or Firm—Blakely, Sokoloff, Taylor & Zafman, LLP

(57) ABSTRACT

Methods and apparatus, including computer systems and program products, for sharing classes and class loaders. One implementation provides a technique for performing a shared load procedure for a class, performing a post load procedure for the class, performing a shared link procedure for the class, performing a post link procedure for the class, and performing an initialization procedure for the class to reduce memory consumption and class loading time. Through performance of these procedures, a first portion of the class (which may include a class block and object) is loaded into a shared memory accessible by multiple runtime systems, and a second portion of the class (which may include a class static variable) as is stored in a local memory associated with a selected runtime system. A shared master copy of the second portion of the class is also stored in the shared memory.

24 Claims, 9 Drawing Sheets

OTHER PUBLICATIONS

Czajkowski, Grzegorz, et al., "A Multi User Virtual Machine", *Sun Microsystems Inc. and S Lab, Purdue University*, pp. 1-14.

Czajkowski, Grzegorz, et al., "Multitasking without Compromise: a Virtual Machine Evolution", *Sun Microsystems Inc.*, 14 pages.

Czajkowski, Grzegorz, et al., "The Barcelona Project", http://www.research.sun.com/projects/barcelona, (Jun. 16, 2004), 1 pg.

Czajowski, Grzegorz, "Application Isolation in the Java(TM) Virtual Machine", *Sun Microsystems Inc.*, pp. 1-13.

Czajowski, Grzegorz, et al., "Code Sharing among Virtual Machines", *Sun Microsystems Laboratories.*, pp. 1-23.

Shankari, Lakshmi, et al., "IBM: Java shared classes; Learn how to start your Java applications faster and with a smaller memory footprint", *Level: introductory*, Retrieved from the internet at: http://www-106.ibm.com/developerworks/java/library/j-shared/, (Jun. 8, 2004), 1-8 pgs.

Sosnoski, Dennis M., "IBM: Java programming dynamics, Part 1 Classes and class loading", *A look at classes and what goes on as they're loaded by a JVM*, Retrieved from the Internet at: http://www-106.ibm.com/developers/java/library /j-dyn0429, (Apr. 29, 2003), pp. 1-7.

Wong, Bernard, et al., "Dynamically Loaded Classes as Shared Libraries: an Approach to Improving Virtual Machine Scalibilty", *Sun Microsystems*, pp. 1-10.

\* cited by examiner

SHARING CLASSES AND CLASS LOADERS

BACKGROUND

The present application relates to digital data processing, and more particularly to sharing classes and class loaders.

FIG. 1 illustrates a client/server system 50 in which a network 75 links a server 200 to client systems 62, 64, 66. The server 200 is a programmable data processing system suitable for implementing apparatus, programs, or methods in accordance with the invention. The server 200 provides a core operating environment for one or more runtime systems that process user requests. The server 200 includes a processor 85 and a memory 90. The memory 90 can be used to store an operating system, a Transmission Control Protocol/Internet Protocol (TCP/IP) stack for communicating over the network 75, and machine-executable instructions executed by the processor 85. In some implementations, the server 200 can include multiple processors, each of which can be used to execute machine-executable instructions. The memory 90 can include a shared memory area 255 (shown in subsequent figures) that is accessible by multiple operating system processes executing in the server 200. An example of a suitable server that can be used in the client/server system 50 is a Java 2 Platform, Enterprise Edition (J2EE) compatible server, such as the Web Application Server developed by SAP AG of Walldorf (Baden), Germany (SAP), or the WebSphere Application Server developed by IBM Corp. of Armonk, N.Y.

Client systems 62, 64, 66 can execute multiple applications or application interfaces. Each instance of an application or an application interface can constitute a user session. Each user session can generate one or more requests to be processed by the server 200. The requests can include instructions or code to be executed on a runtime system (e.g., the virtual machine 100) on the server 200.

A runtime system is a code execution environment that executes instructions or code in user requests and that provides runtime services for that code. Core runtime services can include functionality such as process, thread, and memory management (e.g., laying out objects in the server memory 90, sharing objects, managing references to objects, and garbage collecting objects). Enhanced runtime services can include functionality such as error handling and establishing security and connectivity.

One example of a runtime system is a virtual machine. A virtual machine (VM) is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulate the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The Common Language Runtime is a managed code execution environment developed by Microsoft Corp. of Redmond, Wash. For purposes of simplicity, the discussion in this specification focuses on virtual machines, but it is to be understood that the techniques described herein can also be used with other types of runtime systems.

When executing, runtime systems create and reference local data entities. Many different types of local entities can be created, including, for example, strings, constants, and variables, objects that are instances of a class, runtime representations of a class, and class loaders that are used to load class runtime representations.

SUMMARY

The present invention provides methods and apparatus, including computer program products, that implement techniques for sharing classes and class loaders.

One implementation provides a technique for performing a shared load procedure for executable code, performing a post load procedure for the executable code, performing a shared link procedure for the executable code, performing a post link procedure for the executable code, and performing an initialization procedure for the executable code to reduce memory consumption and loading time. Through performance of these procedures, a first portion of the executable code (which may include a class block and object) is loaded into a shared memory accessible by multiple runtime systems, and a second portion of the code (which may include a class static variable) is stored in a local memory associated with a selected runtime system. A shared master copy of the second portion is also stored in the shared memory.

Another implementation provides a technique for creating a shared loader in a shared memory (the shared loader being accessible by multiple runtime systems), and invoking the shared loader to load executable code to be shared by the runtime systems. In this implementation, each of the runtime systems has an associated local memory, and the shared loader is operable to load the executable code to be shared by storing a shared portion of the code in the shared memory and storing a local portion of the code in the local memory of each of the runtime systems that invokes the shared loader. The executable code may be system code or application code. This technique may also create a shared closure within the shared memory. The shared closure includes a first object and a transitive closure of additional objects referenced by the first object, wherein at least one of the objects is an instance of the code being shared by the runtime systems. The shared closure also includes the shared portion of the code being shared by the runtime systems.

The techniques described in this specification can be implemented to realize one or more of the following advantages. The techniques can be used to create shared class loaders. Shared class loaders can be stored in shared memory and accessed by multiple VMs. A class loader factory can be used to create shared class loaders. The class loader factory can include a declarative interface through which VMs can access or reference shared class loaders. Restricting access to shared class loaders through a declarative interface prevents VMs from using their own shared class loaders or otherwise specifying application code to be used in a shared class loader. Consequently, the result of the class loading process can be guaranteed—i.e., VMs can be guaranteed that a specific class loader in shared memory is a particular class loader that will always load a particular class in the same way.

The techniques can also be used to share classes. Shared class loaders can store the runtime representation of loaded classes in shared memory, thereby allowing such classes to be used by multiple VMs. Both system and application classes can be shared in this manner. Sharing classes can result in a considerable reduction in the amount of memory used for the classes (since the classes do not need to be replicated in each VM), as well as in the amount of time required to load the classes (since each VM does not need to go through the entire class loading process).

By allowing classes to be shared, the techniques also facilitate the sharing of objects. Objects can be shared in groups known as shared closures (a shared closure includes the transitive closure of all the objects referenced by an initial object), meaning that objects are copied into shared memory and accessed along with the other objects in their shared closure group. In some VMs (e.g., Java VMs), objects reference the runtime representation of their class, and the runtime representation of a class in turn references the class loader that loaded the class. In this situation, the applicable class runtime representations and class loaders should technically be included in shared closures, and copied into shared memory along with the other data entities in the shared closures. Although it is possible to share objects in shared closures without also sharing the applicable class runtime representations and class loaders, the disclosed techniques describe a mechanism for storing and using classes and class loaders in shared memory—i.e., for sharing classes and class loaders—and thus provide a means of enabling the sharing of objects through shared closures.

As noted earlier, bytecode can be executed on a Java VM running on any processor or platform. Some VM's are capable of further compiling the bytecode for the real processor or platform using just-in-time (JIT) compilers. In one implementation, multiple VM's can share the compiled bytecode as well. In this implementation, additional VM's do not each have to spend the time and memory to perform the compilation.

One implementation of the invention provides all of the above advantages.

These general and specific aspects can be implemented using a computer program, a method, a system or apparatus, or any combination of computer programs, methods, or systems. Details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

Creating and Using Shared Objects

Multiple runtime systems can be executed in parallel in order to increase the performance, robustness, and scalability of server environments. When multiple runtime systems are executed in parallel, however, objects and other data entities may need to be replicated in the runtime systems. That is, data entities that would only exist once in the heap of single, multi-threaded runtime system may need to be replicated in each of the runtime systems that is running in parallel. This can lead to both resource consumption (e.g., memory for storing the replicated data entities) and time consumption (e.g., time for building and initializing the replicated data entities).

As a simple example, consider a large Java data structure that represents an Extensible Markup Language (XML) configuration file that is parsed when an application first starts up. In replicating such a data structure for each VM executing the application, a server 200 wastes both CPU time (for parsing the XML file and constructing the data structure) and memory (for storing the data structure) for all but the first VM.

To alleviate this problem, one implementation of the server 200 enables data objects to be shared between VMs. In this implementation of the server 200, a shared memory area or heap is used to store data objects that can be accessed by multiple VMs.

The data objects in a shared memory heap should generally not have any pointers or references into any private heap (e.g., the private heaps of the individual VMs). This is because if an object in the shared memory heap had a member variable with a reference to a private object in one particular VM, that reference would be invalid for all the other VMs that use that shared object. More formally, this restriction can be thought of as follows: For every shared object, the transitive closure of the objects referenced by the initial object should only contain shared objects at all times.

Accordingly, in one implementation of the server 200, objects are not put into the shared memory heap by themselves—rather, objects are put into the shared memory heap in groups known as "shared closures." A shared closure is an initial object plus the transitive closure of all the objects referenced by the initial object.

Figure 1:
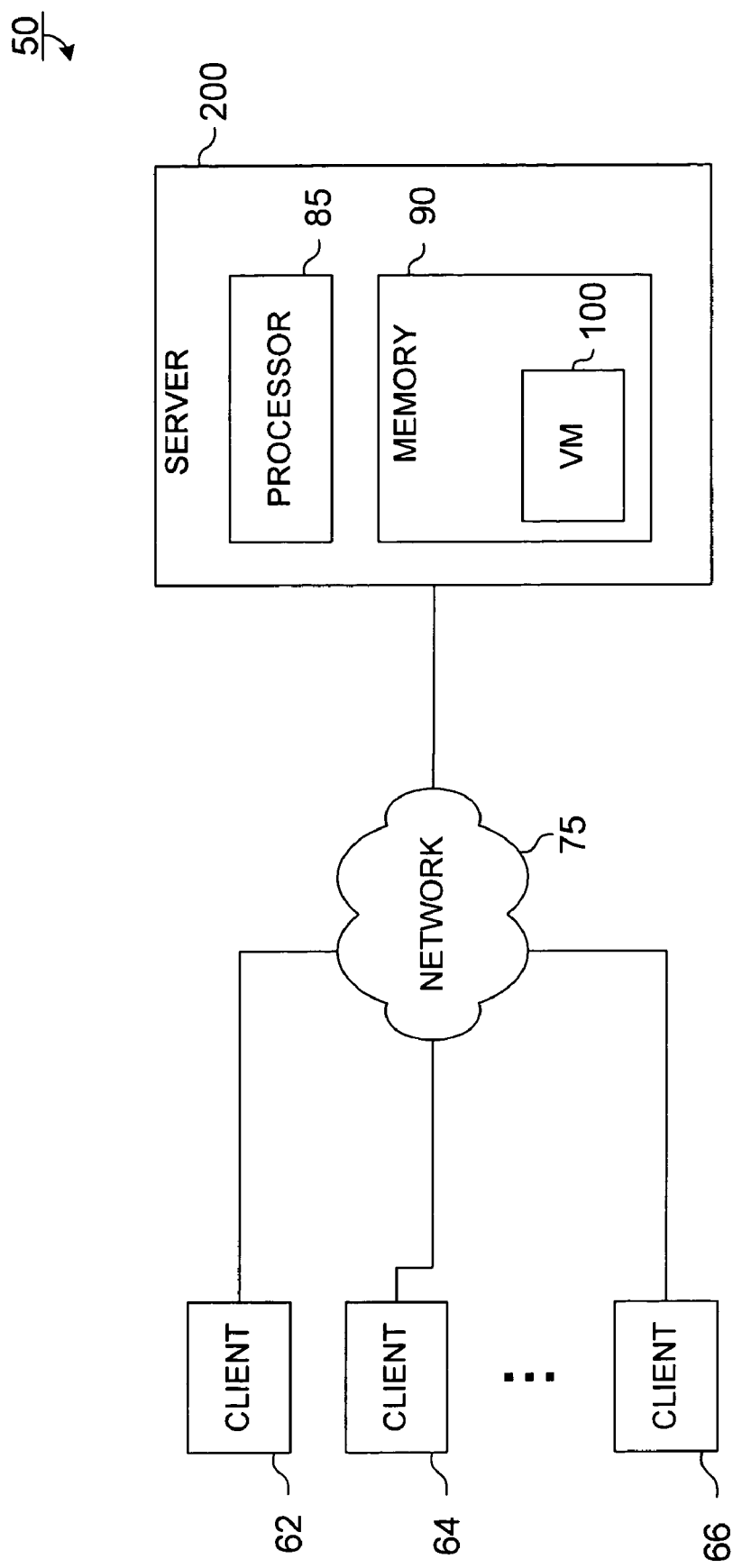
FIG. 1 is a block diagram of a client/server system.
Figure 2:
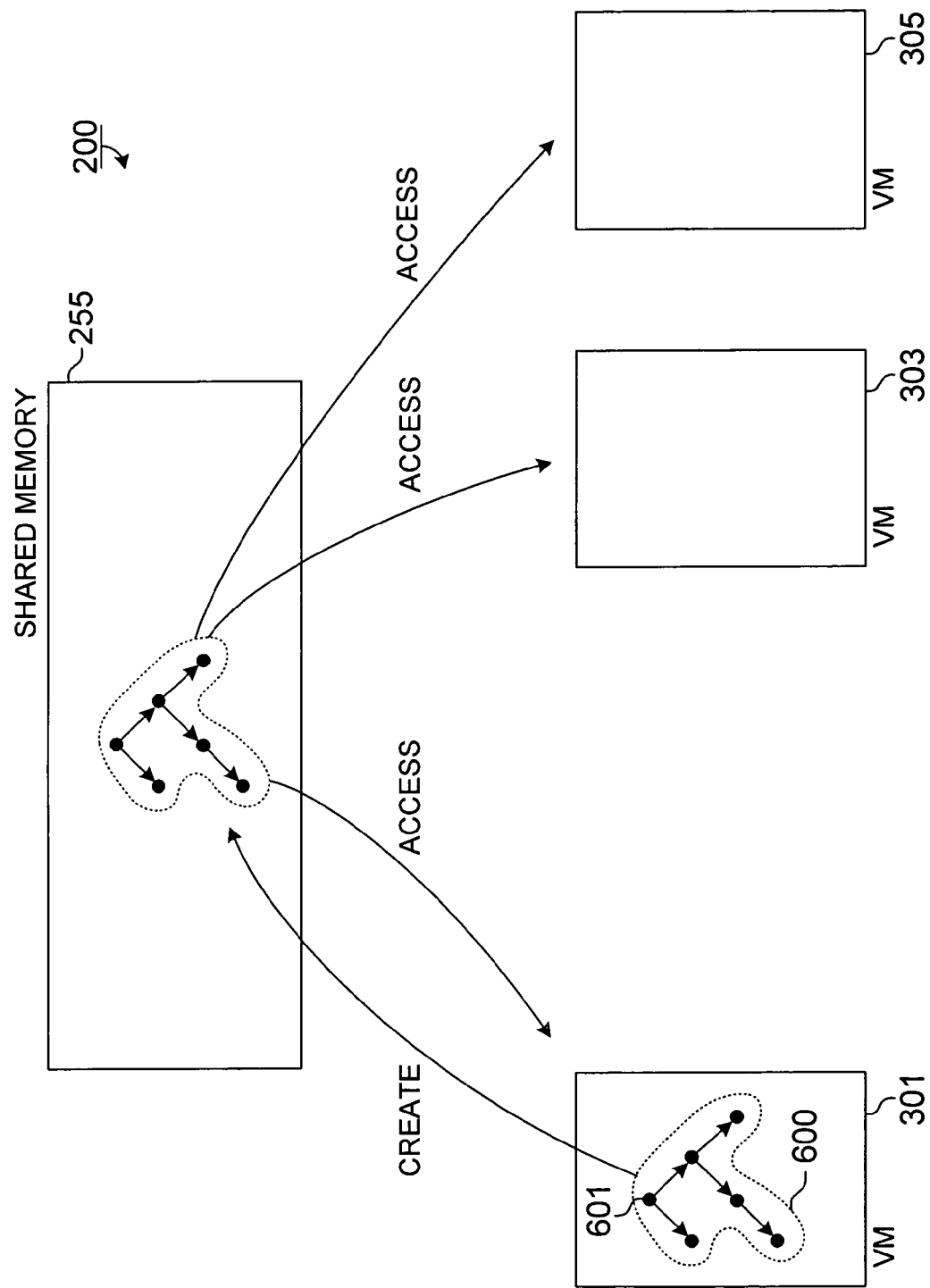
FIG. 2 is a block diagram illustrating the use of shared objects in a server.

The sharing of objects through shared closures is shown conceptually in FIG. 2, where a shared closure 600 has been identified in a first VM 301 by grouping a first object 601 with the transitive closure of all the objects referenced by the first object 601. After the shared closure 600 has been identified, the VM 301 can create the shared closure in a shared memory area 255, e.g., by copying the shared closure 600 into the shared memory area 255. After the shared closure 601 has been created in the shared memory area 255, it can be accessed by the VMs in the server (e.g., VMs 301, 303, and 305). A VM can access the shared closure 600 from the shared memory area 255 by, for example, mapping or copying the shared closure 600 from the shared memory area 255 into the address space of a process in which the VM is executing. The creation and use of shared closures is discussed in more detail below.

In order to be usable within a shared closure, an object must be "shareable." In general, a complex data structure (e.g., a heap or a portion thereof) in one runtime system (e.g., a Java VM) can be shared with a second runtime system if the data structure can be disassembled and then reassembled in the native format of the second runtime system without breaking the internal consistency or functionality of the data structure.

In one implementation of the server 200, objects are shared through the copying of shared closures to and from shared memory. For an object to be shareable in this implementation, the object must be able to withstand a transparent deep-copy into the address space of another VM without breaking the internal consistency or functionality of the object. The shareability requirements for such an implementation are discussed in more detail below.

Although most aspects of shareability are generally properties of the class of an object, the shareability of an object instance can depend not only on the properties of its class, but also on the types of the member variables of the object instance. Where the member variables can have runtime types that cannot be determined until runtime, the shareability of the object instances within a shared closure must be determined at runtime.

Thus, in a server implementation where object instances have runtime types, a distinction can be drawn between a shareable class and a shareable object instance. A class is a shareable class if it meets shareability criteria, examples of which are provided below. An object instance is a shareable object instance if its runtime type is a shareable class, and if all the objects that it references are shareable object instances. In other words, an object instance is a shareable object instance if both of the following conditions are met: (i) the object's runtime class is a shareable class, and (ii) all non-null reference type member variables of the object instance are shareable object instances.

The first condition (that the runtime class of an object is a shareable class) is meant to ensure that instances of a runtime class are semantically able to cope with sharing. Example criteria for determining whether a runtime class is shareable are provided below. While the determination of whether a runtime class is shareable only needs to be made once per class, such a characteristic is not inheritable, because a derived class might add functionality that is incompatible with sharing.

The second condition (that all non-null reference type member variables of an object instance are themselves shareable object instances) is meant to ensure that all the objects in a shared closure are shareable. Whether or not this condition is satisfied can be determined by recursive inspection of the references in an object instance. Due to the non-inheritability of the "shareable class" characteristic, simply inspecting the declared types of all member variables of an object is not sufficient, for although a declared type might be shareable, a runtime type might not be shareable.

Figure 3:
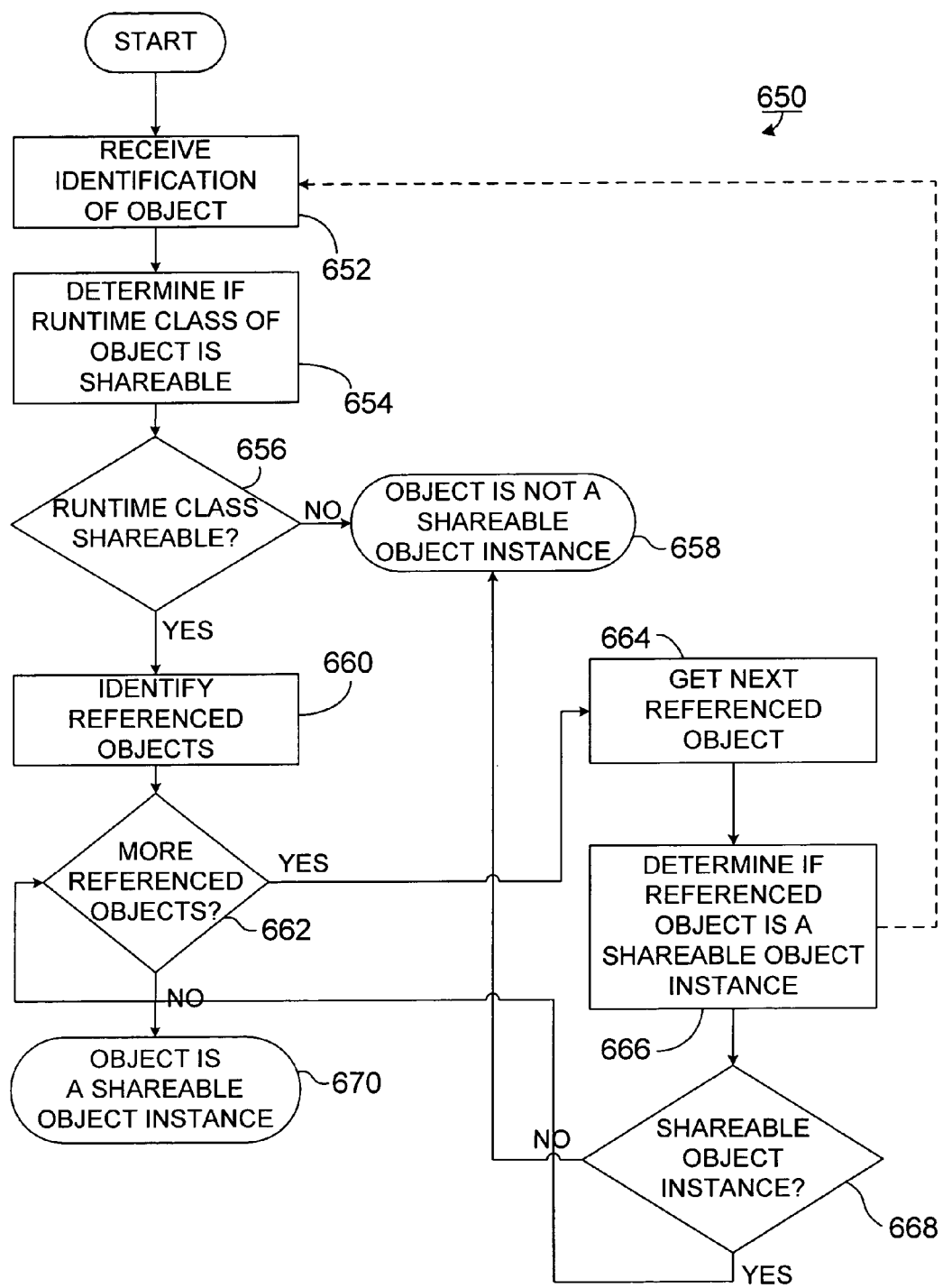
FIG. 3 is a flowchart illustrating a process for determining when an object instance is shareable.

FIG. 3 illustrates a flowchart of a sample process 650 that can be used to determine whether an object instance is a shareable object instance. In the process shown in FIG. 3, an identification of an object instance is first received (652). The runtime class of the object instance is identified, and a determination is made whether the runtime class is a shareable class (654). If the runtime class is not a shareable class ("no" branch of decision 656), the process ends with an indication that the object instance is not shareable (658). Such a negative indication can be made, for example, by raising a "not shareable" exception.

If the runtime class of the object instance is a shareable class ("yes" branch of decision 656), the objects that are referenced by the object instance are identified (660). The process 650 then traverses through the referenced objects to determine whether the referenced objects are shareable object instances. If there are more referenced objects ("yes" branch of decision 662), one of the remaining referenced objects is selected (664). A determination is then made whether the referenced object is a shareable object instance (666). If the referenced object is not a shareable object instance ("no" branch of decision 668), the process 650 ends with an indication that the initial object instance is not shareable (658). This is because one of the objects referenced by the initial object instance is not a shareable object instance, and as stated previously, for an object to be shareable, all of the objects referenced by the initial object must be shareable object instances.

If the referenced object is a shareable object instance ("yes" branch of decision 668), the process 650 checks to see if there are more referenced objects to be analyzed. If there are more referenced objects ("yes" branch of decision 662), the process 650 selects one of the remaining referenced objects and proceeds as before. If there are no more referenced objects ("no" branch of decision 662) and the process has not yet terminated, that means that all of the referenced objects have been analyzed and determined to be shareable object instances. Consequently, the process ends with an indication that the initial object instance is shareable (670).

The determination of whether a referenced object is a shareable object instance can be made recursively—i.e., the process 650 can be invoked again with the referenced object, as shown by the dashed line in FIG. 3. Stated differently, the referenced objects can be traversed recursively, so that a determination can be made with respect to each object in the transitive closure of the referenced objects.

If the initial object and all the objects in the transitive closure of the referenced objects are shareable object instances, the objects can be grouped into a shared closure and shared with another runtime system (e.g., by copying the shared closure to a shared memory area).

The process 650 can be thought of as ultimately determining whether the runtime class of each object in a shared closure is a shareable class. As explained previously, in an implementation in which objects are shared through the copying of shared closures to and from shared memory, an object is generally deemed to be shareable if the object can withstand a transparent deep-copy into the address space of another VM without breaking the internal consistency or functionality of the object. In such an implementation, a class can generally be deemed to be shareable if a VM does not execute any custom code in serializing or deserializing an object instance of the class. The rationale for this rule is that if a VM does not need to execute any custom serialization or deserialization code, the deep-copy operation that is used to copy a shared closure into a shared heap (or from the shared heap into the address space of a VM) is semantically equivalent to the serialization and deserialization of the objects in the shared closure. Hence, if a shared closure has been copied into a shared heap, any VM that maps or copies the shared closure into its own address space should be able to access the objects in the shared closure without any additional actions necessary to deserialize the objects.

Figure 4:
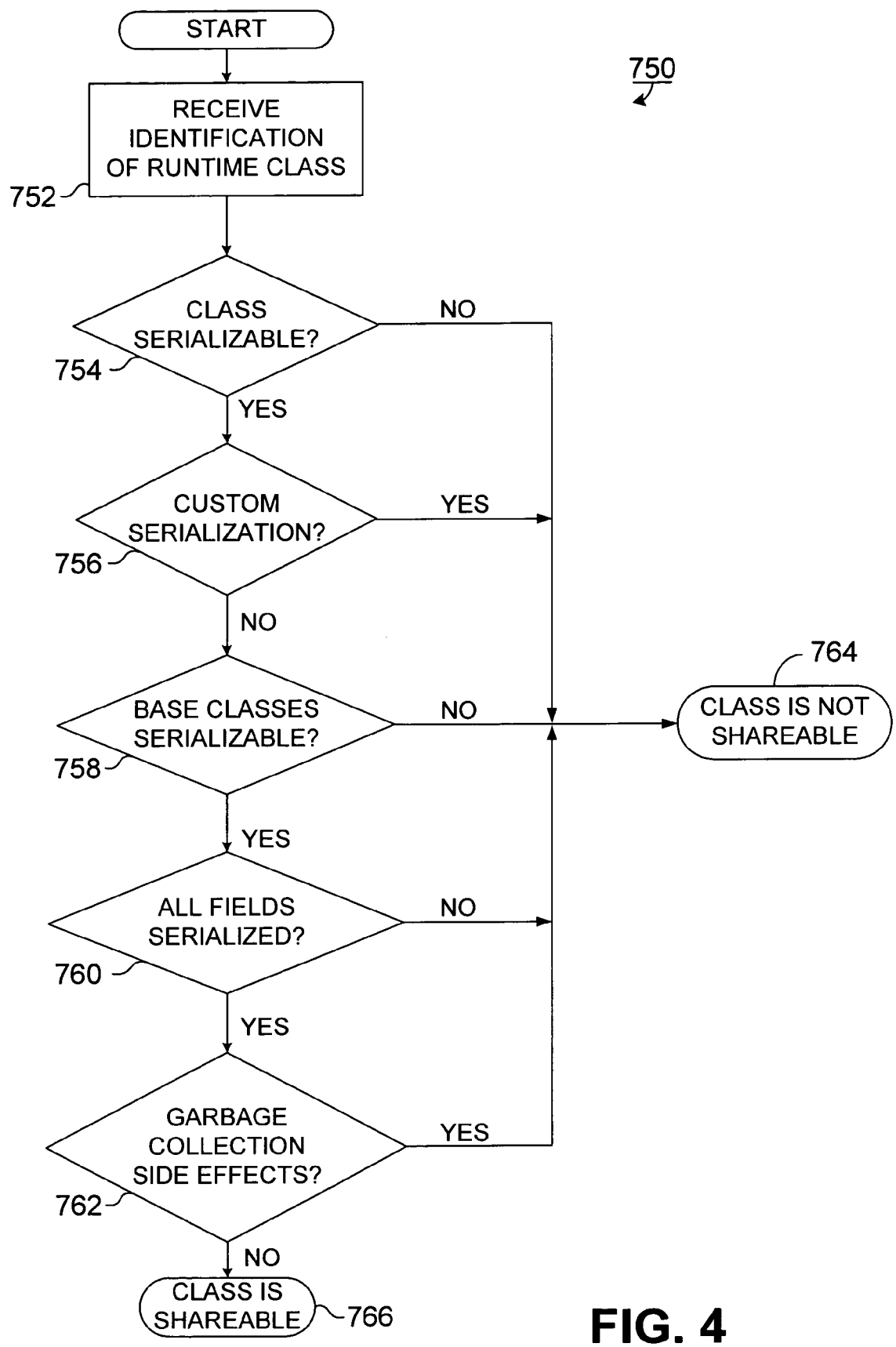
FIG. 4 is a flowchart illustrating a process for determining whether a class is shareable.

FIG. 4 illustrates a flowchart of a sample process 750 that can be used to determine whether a particular class is a shareable class. The process 750 can be used, for example, where the process 650 calls for a determination to be made as to the shareability of a particular runtime class (654). In the process shown in FIG. 7, an identification of a class (e.g., the runtime class of an object instance) is first received (752). A number of criteria are then applied to determine whether the class is shareable. Specifically, the class must satisfy all of the following conditions for the class to be shareable.

First, the class must be serializable (754). In the case of a Java class, this can be determined by checking whether the class implements the marker interface java.io.Serializable. The implementation of the java.io.Serializable interface denotes that an object instance of the class can generally be copied into another address space in a meaningful way. Hence, if a class does implement the java.io.Serializable interface, the first condition is satisfied.

Second, the class must not include any custom serialization or deserialization code (756). In the case of a Java class, this can be determined by checking whether the class implements any of the following methods:

```
private void readObject(ObjectInputStream);
private void writeObject(ObjectOutputStream);
public void readExternal(ObjectInput);
public void writeExternal(ObjectOutput);
{any access} Object readResolve( );
{any access} Object writeReplace( );
```

The above methods constitute custom code that is executed during serialization or deserialization. Such custom code cannot automatically be proven to be equivalent to the deep-copy operation that is performed during the creation of a shared closure. Hence, where a deep-copy operation is used to create shared closures, the implementation of any of the above functions precludes a class from automatically being deemed a shareable class in the process 750.

Third, all the base classes of the class at issue must be serializable (758). In the case of a Java class, this can be determined by checking whether all the base classes implement java.io.Serializable or have a trivial default constructor—if so, the third condition is satisfied. If any base class does not implement java.io.Serializable, its default constructor is executed during deserialization. If the default constructor is trivial—i.e., if the constructor is either empty or invokes a trivial default constructor of a base class, which can be determined through recursive examination of the default constructors—the invocation of the default constructor does not have any effect on deserialization. A non-trivial default constructor precludes a class from automatically being deemed a shareable class in the process 750 because the default constructor may include custom code that is not the equivalent of a deep-copy operation.

Fourth, all the member fields of the class at issue must be serialized (760). In the case of a Java class, this can be determined by checking whether the class has any transient fields or serialPersistentFields fields. Transient fields are fields that are set to their default values during deserialization. Hence, deserializing an object instance of a class with transient fields may not be equivalent to a deep-copy of the object instance. Consequently, the existence of transient fields in a class precludes the class from automatically being deemed a shareable class in the process 750. Classes having serialPersistentFields fields are also excluded because such classes are simply another manner of indicating classes with transient fields.

Fifth, the class must not have any garbage collection side effects (762). Objects that are shared may have different lifecycles than the lifecycles of VMs that use them, and hence may affect garbage collection algorithms executing within the VMs. A garbage collection side effect precludes a class from automatically being deemed a shareable class in the process 750 because the side effect may interfere with proper operation of a garbage collection algorithm. In the case of a Java class, the process 750 can determine that this condition is satisfied by checking that the class has a trivial finalizer and that the class is not derived from the class java.lang.ref.Reference. A trivial finalizer is a finalizer that is either empty or that invokes a trivial finalizer of a base class.

If all five of the above conditions are satisfied, the process 750 ends with an indication that the class at issue is a shareable class (766). If any of the conditions is not satisfied, on the other hand, the process 750 ends with an indication that the class at issue is not a shareable class (764).

In one implementation of the server 200, a class is deemed to be shareable if the class is found to be shareable through a process that is applied automatically (e.g., the process 750), or if the class has been previously declared to be shareable. That is, a class may be shareable even if an automatically applied analysis of the class fails to indicate that the class is shareable.

A class can be declared to be shareable if the class has been inspected (e.g., through a manual review of its source code) and found to be suitable for sharing. For example, in an implementation in which objects are shared through the copying of shared closures to and from shared memory, a class can be suitable for sharing if semantic inspection proves that all violations of the shareability criteria specified above are harmless. Violations of the shareability criteria are generally harmless if, despite those violations, the deep-copy operation that is used to copy a shared closure into a shared heap (or from the shared heap into the address space of a VM) can be shown to be semantically equivalent to serialization and deserialization of the objects in the shared closure.

One simple example of a class that does not satisfy the shareability criteria specified above but that is nevertheless suitable for sharing is the class java.lang.String (as that class is defined in the Java 2 Platform, Standard Edition 1.3). The java.lang.String class violates the fourth condition specified above because it includes a serialPersistentFields field. Manual inspection of the code in the class shows that that field is included in order to implement special handling of object instances of the class during serialization, which is a requirement of the serialization protocol. Nevertheless, it can easily be shown that the effects of a deep-copy are equivalent to serialization for the class. Consequently, the java.lang.String class can be declared to be shareable.

A more complex example of a class that does not satisfy the shareability criteria above but that is nevertheless suitable for sharing is the class java.util.Hashtable (as that class is defined in the Java 2 Platform, Standard Edition 1.3). The java.util.Hashtable class violates the second and fourth conditions specified above because it contains custom serialization methods and transient fields. A review of the code in the class shows that the custom serialization methods and the transient fields are required because hashcodes are not preserved during serialization, which forces hash tables to rebuild their content during deserialization. Since the deep-copy operation preserves hashcodes, however, the deep-copy operation can be shown to be equivalent to serialization and deserialization. As a result, the class java.util.Hashtable can also be declared to be shareable.

Figure 5:
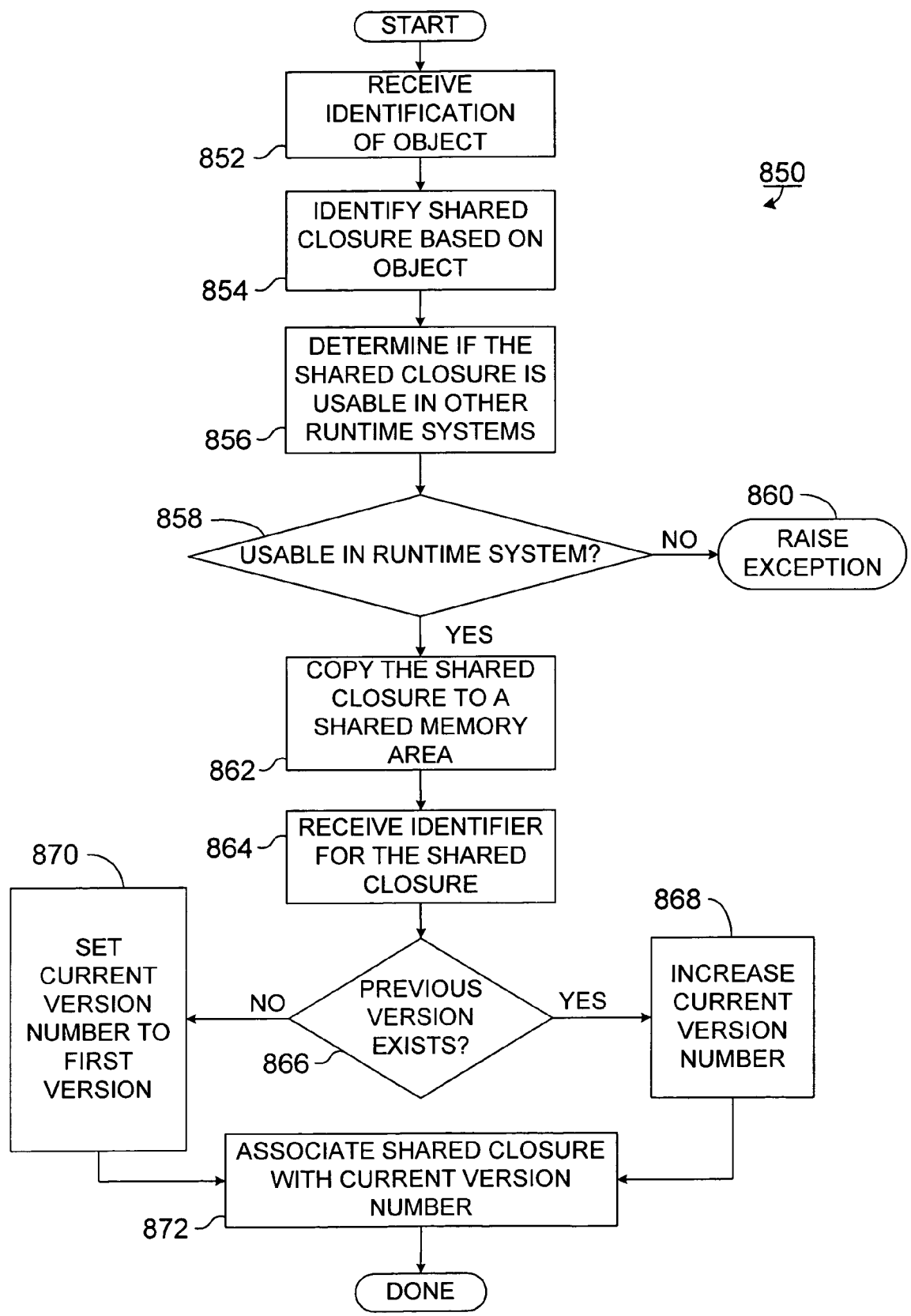
FIGS. 5 and 6 are flowcharts illustrating processes for creating and using shared objects.
Figure 6:
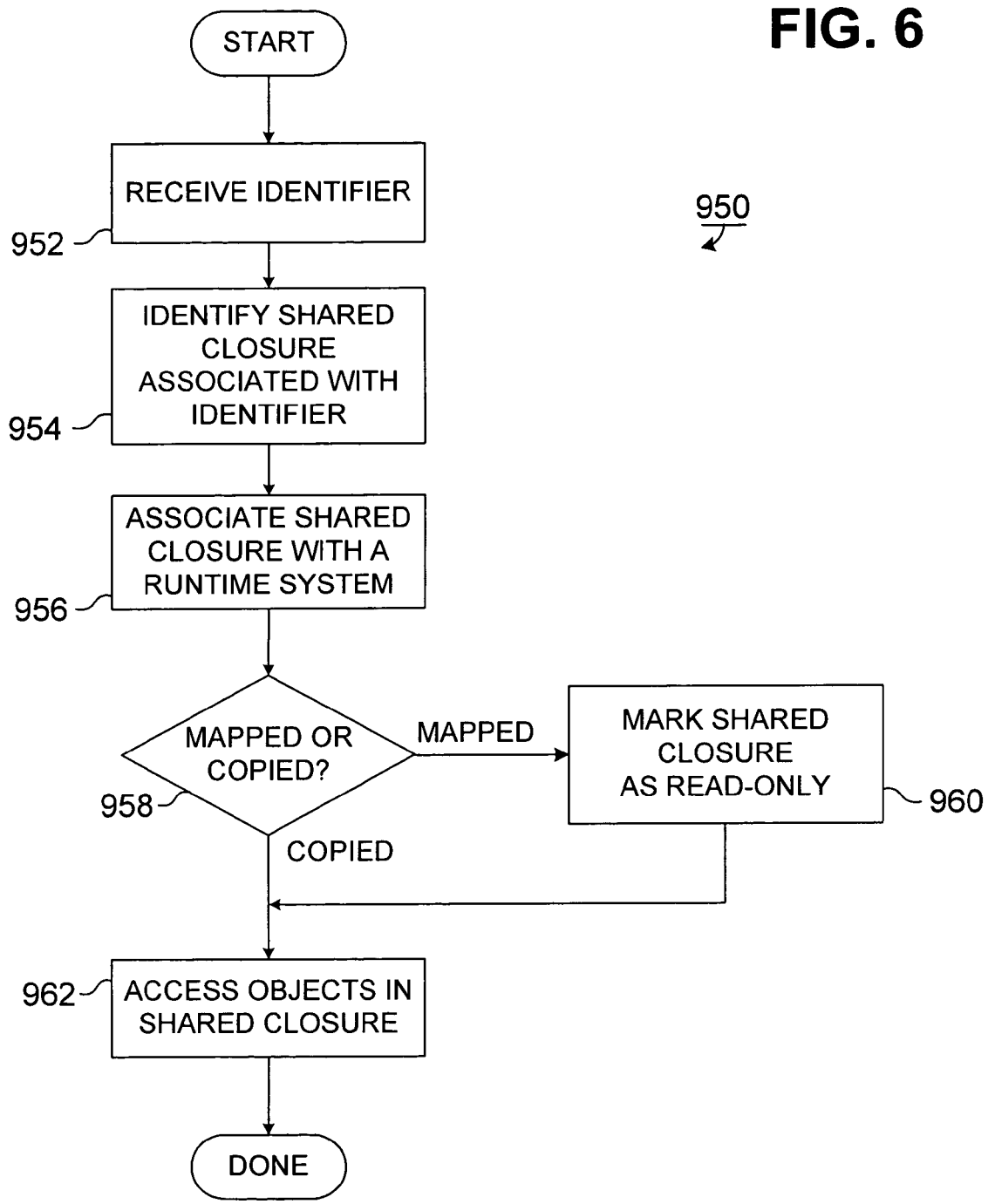

The creation and use of shared closures, which is shown conceptually in FIG. 2, can be realized by the sample processes 850 and 950 illustrated in FIGS. 5 and 6.

The process 850 depicts an example process that can be used to create a shared closure. In the process 850, an identification of an initial object in a first runtime system (e.g., a VM) is received (852). A shared closure—i.e., the initial object plus the transitive closure of all the objects that are referenced by the initial object—is then identified (854), and a determination is made regarding whether the shared closure can be used in or shared by another runtime system (e.g., another VM) (856). This determination can be made, for example, by determining whether the objects in the shared closure are shareable (or more precisely, by determining whether each object instance in the shared closure is a shareable object instance). In one implementation, the operations to identify a shared closure and determine whether the objects in the shared closure are shareable object instances (854, 856) are implemented by the process 650 shown in FIG. 6.

If the shared closure is not usable in another runtime system ("no" branch of decision 858), the process 850 raises an exception or generates some type of negative indication (860). For example, if the objects in the shared closure are not all shareable object instances, the process can raise an exception to indicate that the initial object and its shared closure are not shareable.

If the shared closure is usable in other runtime systems ("yes" branch of decision 858), the process 850 invokes a mechanism to make the shared closure available to the other runtime systems. For example, if objects are shared through the use of shared memory, the shared closure can be copied to a shared memory area (862). In other implementations, the shared closure can be transmitted to one or more runtime systems (e.g., other VMs) through the use of messages or other means of communication.

The process of creating a shared closure can also involve associating a specified name or other identifier with the shared closure (864). Such an identifier can subsequently be used by other runtime systems to identify the shared closure to be accessed.

In some implementations, the process of creating a shared closure also involves the use of versioning. In the process 850, versioning is accomplished through the use of version numbers that are associated with the shared closures stored in shared memory. When a shared closure is created with a given name, a determination is made regarding whether a shared closure with that name already exists in shared memory. If such a shared closure does exit ("yes" branch of decision 866), the current version number associated with the shared closure is increased (868), and the new current version number is associated with the newly created shared closure (872). If there is no shared closure with the given name in shared memory ("no" branch of decision 866), the current version number for the new shared closure is set to a number that indicates a first version (e.g., 0 or 1) (870), and associated with the newly created shared closure (872).

Versioning can be used to update shared closures—e.g., a new, updated version of a shared closure can be created under the same name previously given to the shared closure. In one implementation, when a new version of a named shared closure is created, all subsequent operations to associate the named shared closure with a VM use the new version of the shared closure. VMs that are already accessing the shared closure (e.g., VMs that have a previous version of the shared closure mapped into their address space) are not affected by the new version—they simply keep all object references to the old version. In this implementation, multiple versions of a shared closure can coexist in shared memory until the obsolete versions are no longer referenced by any VM and thus can be garbage collected.

FIG. 6 illustrates a flowchart of a sample process for accessing and using a shared closure. In the process 950, a name or other identifier is received (952) and used to identify an associated shared closure (954). The name or other identifier corresponds to the identifier that was associated with the shared closure when the shared closure was created (e.g., in the operation 864 in the process 850). Where versioning is implemented, if more than one version of a specified shared closure exists, the most recently created version of the specified shared closure is identified.

The identified shared closure is then associated with a runtime system (e.g., a VM) (956). In one implementation, a shared closure can be associated with a runtime system in one of two ways—either by mapping the shared closure from a shared memory area into the address space of the runtime system, or by copying the shared closure from the shared memory area into the address space of the runtime system. After the shared closure has been associated with the runtime system, the objects within the shared closure can be accessed using normal operations (e.g., normal Java operations) (962).

In some implementations, access to the objects in a shared closure may depend on how the shared closure is associated with the runtime system. For example, in one implementation, if a shared closure is mapped into the address space of a VM ("mapped" branch of decision 958), access to the objects in the shared closure is restricted to read-only access (960). Because of this restriction, any attempt to write to a member variable of an object instance in the shared closure will result in an error. This restriction can be useful to prevent VMs from "breaking" shared object instances by, for example, overwriting a reference member variable in a shared object instance with a reference into a VM's private heap, or otherwise breaking the internal consistency or functionality of the shared objects.

If, on the other hand, a shared closure is copied into the address space of a VM ("copied" branch of decision 958), the VM is granted full read-write access to the copied objects. In such an implementation, the objects in a shared closure can thus be updated by copying the shared closure into the address space of a VM, modifying the content of the objects in the shared closure, and then creating a new version of the shared closure in shared memory (e.g., using the process 850 shown in FIG. 5).

Other approaches can be used to associate a shared closure with a runtime system and to provide access to the objects in the shared closure from the runtime system. For example, a copy-on-demand approach can be used. In one such implementation, a shared closure is mapped into the address space of a VM without restricting access to the shared closure to read-only access. Instead, access to the shared closure is monitored, and, upon detecting the first attempted write access to the shared closure, the shared closure is copied into the address space of the VM, thereby transforming the shared closure from a mapped shared closure into a copied shared closure. The attempted write access is then allowed to complete, and subsequent read and write accesses to the copied shared closure can proceed as they would normally. If the heap address of a shared closure changes when the transformation from a mapped shared closure to a copied shared closure occurs, existing references to the heap have to be redirected to the newly created copy of the shared closure. Alternatively, underlying OS features can be used to map a shared closure in a manner that allows the OS to provide copy-on-demand functionality without heap address changes.

In addition to functions for creating, mapping, and copying shared closures, an Application Programming Interface (API)

can include additional functions for managing shared objects. For example, an API can also include a "delete" function. One implementation of a "delete" function takes a name or other identifier as an input parameter, and marks the associated shared closure in shared memory as being deleted. Marking a shared closure as deleted does not affect VMs that are already accessing the shared closure, but VMs that subsequently try to access the shared closure (e.g., by mapping or copying the shared closure into their address spaces) are precluded from doing so.

In an implementation of the server 200 in which shared closures can be mapped into the address spaces of VMs, garbage collection for deleted or obsolete versions of shared closures can be performed by keeping track of the number of VMs that have a shared closure mapped into their address space. A count can be incremented each time a VM maps a shared closure into its address space. The count can be decremented when, in the course of its own garbage collection, a VM determines that it no longer includes any references into the previously mapped shared closure. When the count associated with a particular shared closure reaches zero, that shared closure can be deleted from shared memory.

In Java, an object instance typically includes a reference to a runtime representation of the class of the object instance, and the class runtime representation in turn contains a reference to a class loader for the class. Consequently, the runtime representation and the class loader associated with a Java object instance are included in the shared closure of the object instance, which means that the runtime representation and the class loader must themselves be shareable in order for the object instance to be shareable. Thus, in a server implementation that includes class runtime representations and class loaders, two additional criteria can be used to determine whether a particular class is shareable: The class should have a shareable runtime representation and a shareable class loader.

Various techniques can be used to deal with class runtime representations and class loaders (i.e., to make class runtime representations and class loaders "shareable"). One technique involves actually sharing class runtime representations and class loaders. That is, when an object instance is copied to shared memory, the runtime representation and class loader corresponding to the class of the object instance are also copied to shared memory, so that they can be accessed by all VMs (e.g., through a mapping operation). Various optimizations of this technique are possible. For example, before copying the runtime representation of a class into shared memory, the shared memory can be checked to determine if a runtime representation for that class already exists in the shared memory—if so, the reference to the runtime representation in the object instance being copied into shared memory can simply be set to refer to the runtime representation that already exists in shared memory.

A second technique for handling runtime representations and class loaders is not to share them, but to make sure that they are located at fixed locations in each VM. In other words, the runtime representation and class loader for each class must be located at the same, fixed address in each VM. The reference to the runtime representation in each object instance can then be set to the location that corresponds to the runtime representation for the class of the object instance. With this approach, references to runtime representations are valid regardless of whether object instances are mapped from shared memory or copied into address spaces.

Fixing the location of the runtime representation for each class may not be practical, however. Hence, a third technique for handling runtime representations and class loaders is to adjust the references to runtime representations for each object instance when the object instance is copied into a VM. As with the prior technique, runtime representations and class loaders are not shared in this technique—i.e., each VM stores its own runtime representation and class loader for each class. However, unlike the prior technique, this technique does not require the location of each runtime representation and class loader to be fixed in each VM. Instead, the locations of runtime representations and class loaders can be different in each VM. When an object instance is copied into a particular VM, the location of the appropriate class runtime representation is determined, and the corresponding reference in the object instance is set to that location.

The third technique for dealing with runtime representations—adjusting references to the runtime representations in each VM—precludes object instances from being mapped into multiple VMs simultaneously. This is because as indicated earlier, object instances that are shared cannot have references into any private heaps. Since the third technique adjusts references to refer to private runtime representations in each VM, the technique can only be used when objects are copied into the address spaces of VMs, or in other circumstances where objects are only accessed by one VM at a time (e.g., in an implementation where object instances can be mapped "exclusively," so that when an object instance is mapped into one VM, no other VMs can map that object instance).

The third technique discussed above may be useful in a cluster architecture, where VMs can be executing on multiple physical machines. Runtime representations are generally not shared across physical machines, so references to runtime representations must be adjusted when an object instance is shared across physical machines (e.g., when an object instance that is being used in a VM on one physical machine is transmitted to a second physical machine to be used in a VM on that machine).

Creating and Using Shared Classes

As discussed above, one technique for enabling shared closures is to share classes and class loaders. (Note that classes and class loaders can be shared using the mechanisms described below without necessarily sharing object instances—i.e., the mechanisms for sharing classes and class loaders can be used independently of mechanisms for sharing objects, such as shared closures.)

Figure 7:
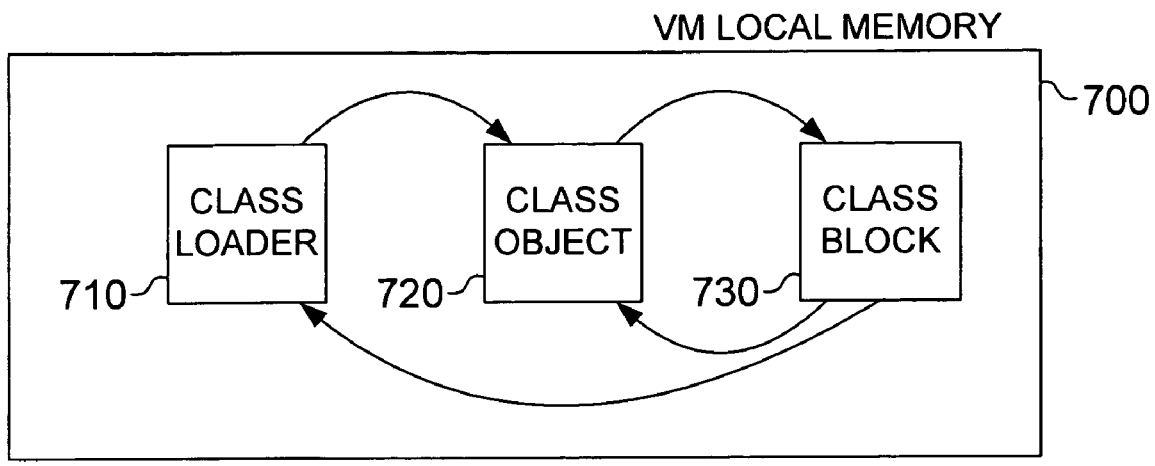
FIG. 7 is a block diagram illustrating a class in the local memory of a VM.

As illustrated in FIG. 7, in some runtime systems (e.g., Java VMs), classes include a class object 720 and a class block 730. In Java, the class object 720 is an instance of the class java.lang.Class that is visible to Java programs, and that contains a reference to the class block 730. The class block 730 is an internal data structure in a VM that contains descriptions of the class's methods, fields, constant pools, and other data. As shown in FIG. 7, the class block 730 contains references to the class object 720, as well as to the class loader 710 that defined the class. In addition, the class loader 710 contains a reference to the class object 720.

Classes are normally loaded in the local memory 700 of a VM. This is usually accomplished through the class loading process 800 illustrated in FIG. 8. As described in the Java VM Specification, which can be found at the Universal Resource Locator (URL) http://java.sun.com/docs/books/vmspec/2nd-edition/html/VMSpecTOC.doc.html, the normal class loading process includes the operations of loading a class (802), linking the class (804), and initializing the class (806).

The loading operation 802 involves retrieving a binary representation of a class (e.g., a class definition created by compiling Java source code for the class), and using the binary representation of the class to construct a class object

720 and a class block 730 that represent the class. The class's superclasses and superinterfaces are also loaded recursively.

In some implementations, multiple class loaders can be used to load classes into a VM. Applications can define their own class loaders in order to enhance the functionality offered by standard class loaders (e.g., by adding features such as the ability to authenticate the source of a retrieved binary representation of a class). Class loaders can be arranged in a hierarchy, and a class loader can delegate the loading of a class to its parent class loader.

The purpose of the linking operation 804 is to combine a loaded class into the runtime state of a VM so that the class can be executed. As described in the VM Specification, linking can include the sub-operations of verification, preparation, and (optionally) resolution. Verification is the process of ensuring that the binary representation of a class is structurally correct. Preparation is the process of allocating static fields for a class and initializing the static fields to default values. Resolution is the process of validating symbolic references in a class (e.g., references to classes, fields, and methods), and typically replacing the symbolic reference with direct references. The linking operation 804 can also involve the recursive linking of the class's superclasses and superinterfaces.

The initialization operation 806 involves executing the static initializers of a class, including the initializers for the static fields of the class. As described in the VM specification, a class must be loaded and linked before it can be used at all in a VM. The class must also be initialized before it can be actively used in a VM. Examples of actively using a class include instantiating an object of the class, accessing static members of the class, or calling static methods of the class. It should be noted that although the loading operation 802 is referred to as "class loading," sometimes (as in this specification) the overall process 800—i.e., the process of bringing a class into a VM and making the class available to the VM—is also referred to as "class loading."

Figure 9:
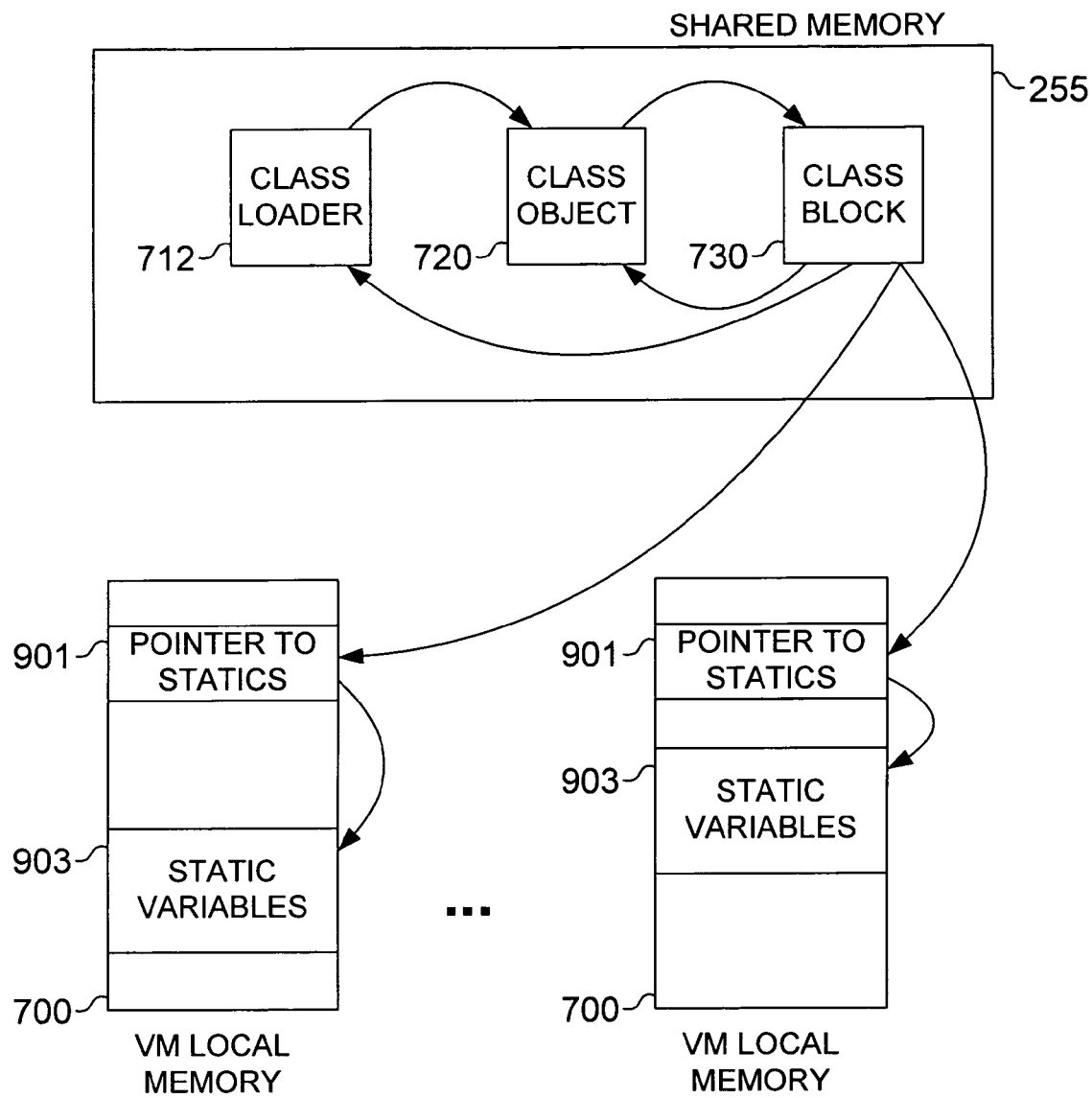
FIG. 9 is a block diagram illustrating a shared class and a shared class loader.

To share classes, VMs can use a special class loader—a shared class loader 712—that is stored in shared memory 255, as illustrated in FIG. 9. The shared class loader 712 follows special class loading steps to load classes into shared memory so that the classes can be accessed and used by multiple VMs. More specifically, the shared class loader 712 creates separate data structures to store the shared and private states of a class (the shared state being the portion of a class that can be shared between VMs, and the private state being the portion of the class that must remain local for each VM). The shared class loader 712 then uses a special class loading process, which is an adaptation of the conventional class loading process 800 that is designed to load the shared state of a class (e.g., the class object 720 and the class block 730) into shared memory 255, and the private state of the class (e.g., the block of static variables 903) into the local memory 700 of each VM that requests the class to be loaded.

In one implementation, VMs create a shared class loader by using a shared class loader service or factory that interacts with shared memory. The application programming interface (API) of the class loader factory includes a single "create" method. The "create" method takes as input parameters that provide a declarative description of the desired shared class loader, and returns a reference to the shared class loader (which is instantiated in shared memory) that is described by the parameters.

The parameters can include, for example, a specification of a parent class loader (which should be a shared class loader as well), a set of class definitions (typically a set of URLs for archive files or directories with class files, which are sometimes collectively referred to as the "class path" for a class loader), and a symbolic name for the class loader.

If a shared class loader that is described by a given set of parameters already exists in shared memory (e.g., because a VM has previously created a shared class loader with these parameters), the "create" method can simply return a reference to the existing class loader in shared memory. Otherwise, the "create" method can create a new shared class loader using the indicated parameters, and return a reference to the newly created shared class loader.

The creation and use of shared class loaders as described above makes it possible for arbitrary Java programs to share classes (including both application and system classes). In particular, the use of a shared class loader service or factory is important, because it prevents programs from changing the parameters or settings of existing shared class loaders. The fact that a class is shared should generally not be observable to Java code, and were it possible for one program to make such changes to a shared class loader, a different program could experience observably different behavior depending on whether or not it used shared versus private classes and class loaders.

Stated differently, in contrast to conventional class loaders, shared class loaders are not only shared (e.g., by being stored in shared memory, where a single instance of a particular class loader can be accessed by multiple VMs), but they can only be referenced declaratively. Whereas an application can typically specify code for a class loader that it creates, the use of a shared class loader factory prevents the specification of application code for shared class loaders. Instead of specifying code, applications describe a shared class loader to the factory, and the factory obtains the described shared class loader for them. Without such a mechanism to restrict application code, applications could not be guaranteed that a specific loader in shared memory is a particular loader that loads particular classes in a particular manner.

As discussed above, shared class loaders use a modified class loading process that loads the shareable portion of a class into shared memory, and generates as much local state as is required for each VM that loads the class. In general, the goal is to share as much of a class as possible, so as to minimize the number of references from shared memory into the local memories of individual VMs. Thus, as shown in FIG. 9, the class object 720 and the class block 730 for a given class are shared.

Interned strings can and should also be shared. According to the Java specification, interned strings must be kept unique in a lookup table. Class blocks have references to interned strings in their constant pool (this is because the Java VM specification requires string constants in classes to be interned). As mentioned previously, shared objects should avoid having references to non-shared objects. Hence, if classes are to be shared, the table of interned strings, as well as the interned strings themselves, should also be shared. This can easily be achieved by copying a string to shared memory when it is first interned, and treating it as an object in a shared closure afterwards.

Classes can contain some state that cannot be shared between VMs. Non-shareable or local state includes the static variables used in a class, the local post-link state, and the initialization state of the class, along with the protection domain assigned to the class by a VM local security policy. This local state is generated and maintained separately in each VM that loads the class.

When a class is loaded, a VM can assign a protection domain to it, depending on the type of class loader. A protection domain describes the security attributes and permissions of a class. Security-conscious class loaders call the VM local security manager, which can be configured by application code, to assign a protection domain to a class depending on the class's code source. A code source includes the location (e.g., Uniform Resource Locator, or URL) the class was loaded from and any digital signatures that were attached to the binary representation of the class.

Because the protection domain depends on the configuration of the VM local security manager, it is retrieved in each VM. The code source, on the other hand, only can include information that is identical for all VMs using a particular class loader, so it can be stored in shared memory.

FIG. 9 illustrates an example of the special handling that is required for the local state of a shared class. Static variables, which are part of the local state of a class, are normally accessed by means of a pointer in the class block. For shared classes, this requires following a pointer from a class block 730 in shared memory into a local VM memory 700. Various mechanisms, such as an extra indirection pointer, can be used to ensure that the pointer from the class block works properly for all VMs. As shown in FIG. 9, the extra indirection pointer can point from the class block to a fixed location in each VM. The fixed location can store a pointer 901 that in turn points to the location of the actual statics 903 in a particular VM. Other mechanisms (e.g., lookup tables) can also be used to deal with references from shared memory to VM local state.

Figure 8:
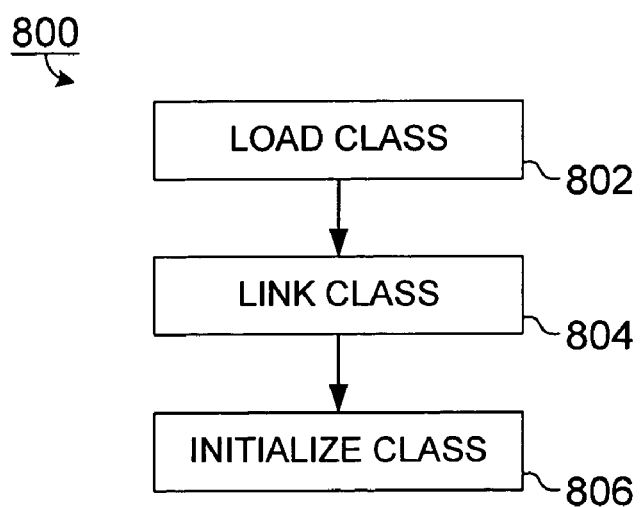
FIG. 8 is a flowchart illustrating a process for loading a class into the local memory of a VM.

As previously mentioned, the normal class loading process (including the loading, linking, and initialization operations shown in FIG. 8) must be specially adapted for shared class loaders in order to distinguish between and handle the shared and non-shared portions of a class. In particular, the loading and linking operations can each be divided into two steps— one to deal with the shared portion of a class and one to deal with the non-shared or local portion of the class. This division is illustrated by the example class loading process illustrated in FIG. 10.

Figure 10:
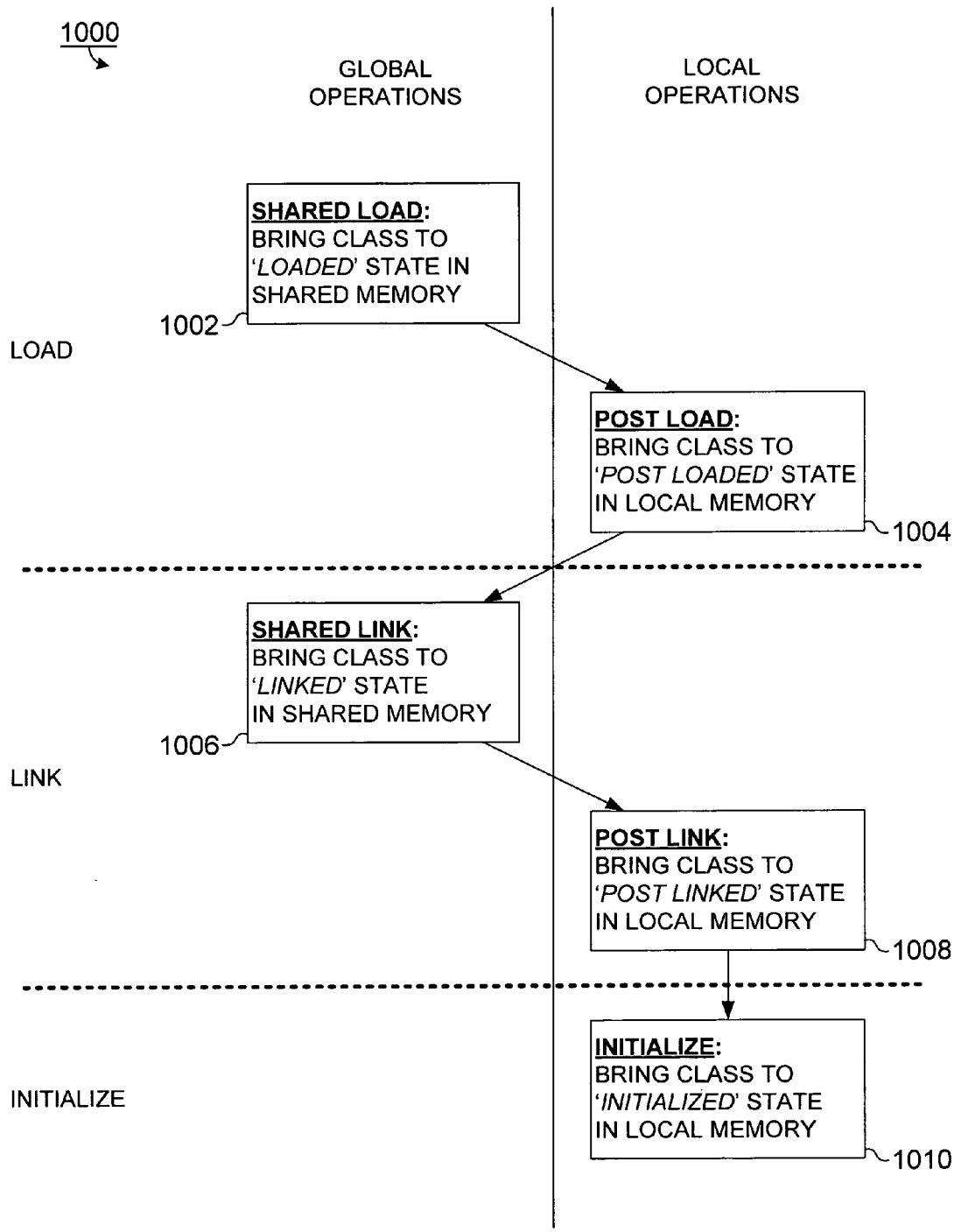
FIG. 10 is a flowchart illustrating a process for loading a shared class.

As shown in FIG. 10, the normal loading operation is divided into two steps—a shared load operation 1002 and a post load operation 1004. Similarly, the normal linking operation is divided into two steps—a shared link operation 1006 and a post link operation 1008. The shared load operation 1002 and the shared link operation 1006 are global operations that handle the shared portion of a class and that are only performed once per class in shared memory. The post load operation 1004, the post link operation 1008, and the initialize operation 1010 are local operations that handle the local portion of a class and that are performed once for each VM that loads a given shared class.

As the process 1000 proceeds, the shared and local portions of class go through various states. The shared portion of a class can be in one of the states shown in Table 1 below.

TABLE 1

States for the Shared Portion of a Class

| State | Description |
|---|---|
| loaded | The shared portion of a class, as well as the shared portions of all of the class's superclasses and superinterfaces, have all been created in shared memory. This includes storing the class's code source in shared memory. |
| linked | The shared portion of a class, as well as the shared portions of all of the class's superclasses and superinterfaces, have all been linked in shared memory. This includes the preparation of a shared master copy of all static variables. |

Each state is an extension of the preceding state. For example, a class that is in the "linked" state is also "loaded". The local portion of a class in a VM can be in one of the states shown in Table 2 below.

TABLE 2

States for the Local Portion of a Class

| State | Description |
|---|---|
| found | The class has been found in shared memory (i.e., the shared portion of the class must be in at least the "loaded" state in shared memory). |
| post loaded | The local portion of the class, as well as the local portions of all of the class's superclasses and superinterfaces, have all been created in local memory. This includes allocating VM local memory for the static variables and the initialized flag of the class, and having the VM local security manager assign a protection domain for the class, using its code source that is stored in shared memory. (This implies that the shared portion of the class is in at least the "loaded" state in shared memory.) |
| post linked | A local copy of the prepared statics for the class has been made from the shared portion of the class. (This implies that the shared portion of the class must be in at least the "linked" state in shared memory.) |
| initialized | The static initializers for the class have been executed in the current VM. |

Each state is an extension of the preceding state. For example, a class that is in the "post linked" state is also "post loaded". Given the preceding states for the shared and local portions of a class, the class loading process 1000 for a shared class can be described as follows.

Shared classes can be kept in a lookup table. (A shared class can be added to the lookup table when it reaches the "loaded" state.) When a VM requests a shared class to be loaded, a shared class loader can first attempt to delegate the request, as per the normal parent delegation model. Assuming the shared class loader proceeds with the request to load the class, at the point where a conventional class loader would normally look into its loader cache to determine whether the class has already been loaded, the shared class loader additionally tries to look up the class in the shared lookup table. If the class is found there, it is brought to the "post loaded" state and returned.

At the point where a conventional class loader would normally try to define the class, the shared class loader brings the class to the "post loaded" state in the local memory of the VM in which the class is being loaded. This can require the shared class loader to first bring the class to the "loaded" state in shared memory (if the class is not already in that state).

At the point where a conventional class loader would normally try to link the class, the shared class loader brings the class to the "post linked" state in the local memory of the VM in which the class is being loaded. This can require the shared class loader to first bring the class to the "linked" state in shared memory (if the class is not already in that state).

More specifically, the operations in the process 1000 can be described as follows:
    shared load operation: (brings the shared portion of a class to the "loaded" state)
        create a shared class block in shared memory
        create a shared class object in shared memory
        perform the shared load operation for all superclasses and superinterfaces
        store the shared class block in a shared lookup table
        store the shared code source in shared memory
    post load operation: (brings the local portion of a class to the "post loaded" state)

ensure that the shared portion of the class is at least in the "loaded" state in shared memory (i.e., bring it to that state if it is not already there)

allocate space in the local memory of the current VM for the statics of the class and for local flag fields describing the post link and initialization state of the class have the VM local security manager assign a protection domain for the class, using its code source stored in shared memory perform the shared load operation for all superclasses and superinterfaces put the class into a local loader cache so that it can be found there if another attempt is made to load it shared link operation: (brings the shared portion of a class to the "linked" state)

ensure that the shared portion of the class is at least in the "loaded" state in shared memory (i.e., bring it to that state if it is not already there)

perform verification and preparation on the shared portion of the class (initializing a shared master copy of all the statics of the class in shared memory)

transform all string constants used by the class into shared interned strings perform the shared link operation for all superclasses and superinterfaces post link operation: (brings the local portion of a class to the "post linked" state)

ensure that the shared portion of the class is at least in the "linked" state in shared memory (i.e., bring it to that state if it is not already there)

copy the shared master copy of the statics of the class from shared memory to the space allocated in the local memory of the current VM during the post load operation set the local flag field to indicate that the state of the local portion of the class is "post linked"

perform the post link operation for all superclasses and superinterfaces initialize operation: (brings the local portion of a class to the "initialized" state)

ensure that the state of the local portion of the class is "post linked" (i.e., bring it to that state if it is not already there)

call the class initializers if the class has any perform the initialize operation for all superclasses (but not for superinterfaces)

set the local flag field to indicate that the state of the local portion of the class is "initialized"

As mentioned previously, resolution is the process of resolving references in the constant pool of a class. Resolution can optionally be performed as part of the class loading process, or it can be performed subsequently, during code execution. For shared classes, resolution can be carried out on the shared class blocks, thus making the results of the resolution process immediately available for all VMs. In one implementation, an optimization that is common in VM implementations should be avoided. Because a class needs to be initialized before it can be used actively, each of the active uses described previously (instantiating an object of the class, accessing the static members of the class, or invoking the static methods of the class) requires a check to verify whether the class has been initialized (and execution of the initialization operation if the class has not been initialized). If such a check is performed during resolution, the check is no longer required afterwards. Frequently, VMs take advantage of this fact by changing the opcodes of the active use operations (instantiation, access to static members, and invocation of static methods) after successful constant pool resolution into a variant of the opcodes that omits the check. This technique, which is sometimes referred to as "quickening," is not applied to shared classes, according to one implementation. Initialization is a local operation that is to be carried out by each VM, even if other VMs have previously resolved and initialized a shared class. Hence, in this implementation, the initialization check is performed even if another VM has previously resolved all the entries in the constant pool of a class.

One implementation also provides for the storing and sharing of generated, platform-specific machine code. There are certain VMs that employ Just-in-Time (JIT) compilers to generate platform-specific machine code for loaded classes. This machine code is generated dynamically (i.e., "just-in-time"), usually for methods that are frequently called, and is stored in the class block. Executing the machine code instead of interpreting the byte code allows for performance optimizations. The platform-specific machine code that is generated by a JIT compiler can be stored in the shared portion of the class (e.g., in the shared memory 255 shown in FIG. 9), along with shared class loaders. By doing so, multiple VMs have access to this generated code and are able to take advantage of the optimizations without having to spend the time and memory to perform the compilation themselves. Just as described above, however, class initialization is a local operation that is to be carried out by each VM, even when a VM is able to access generated machine code that is stored in the shared memory space.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 4 does not require the particular order shown, or sequential order, to achieve desirable results (e.g., the operations to determine whether all the fields of a given class are serialized and whether all the base classes of the given class are serializable can be performed at many different places within the overall process). In certain implementations, multitasking and parallel processing may be preferable. Other embodiments are within the scope of the following claims.

What is claimed is:

1. A computer-readable storage medium comprising instructions which, when executed, cause a machine to:
   create a shared loader accessible by a plurality of runtime systems in a shared memory, the shared loader to have a runtime representation of a class loaded in the shared memory to allow the class to be used by the plurality of runtime systems, wherein access to the shared loader by the plurality of runtime systems is restricted to receive a set of parameters providing a declarative description of the shared class loader via a declarative interface; and return a reference to the shared class loader, the declarative interface to further
      prevent each of the plurality of runtime systems from using their own shared loader or from specifying an application code to be used in the shared loader, and guarantee the class is loaded consistently in each of the plurality of runtime systems; and
   invoke the shared loader to load executable code to be shared by the runtime systems, the executable code to include a shared portion and a local portion wherein
      the shared portion of the executable code is stored in the shared memory, and
      the local portion of the executable code is stored in a local memory of a runtime system invoking the shared load.

2. The computer-readable storage medium of claim 1, wherein the instructions which, when executed, further cause the machine to invoke a shared loader service with a declarative description of the shared loader.

3. The computer-readable storage medium of claim 1, wherein the executable code to be shared comprises a system code or the application code.

4. The computer-readable storage medium of claim 1, wherein the runtime systems comprise one or more of Java virtual machines and Common Language Runtime (CLR) virtual machines.

5. The computer-readable storage medium of claim 1, wherein the executable code comprises a class.

6. The computer-readable storage medium of claim 5, further comprising the instructions which, when executed, further cause the machine to create a shared closure in the shared memory, the shared closure comprising:
   a first object and a transitive closure of additional objects referenced by the first object, wherein at least one of the objects is an instance of the class being shared by the runtime systems; and
   the shared portion of the class being shared by the runtime systems.

7. The computer-readable storage medium of claim 1, wherein the shared portion of the executable code in the shared memory includes generated machine code.

8. The computer-readable storage medium of claim 7, wherein the generated machine code comprises platform-specific machine code generated by a compiler.

9. A method comprising:
   creating a shared loader accessible by a plurality of runtime systems in a shared memory, the shared loader to have a runtime representation of a class loaded in the shared memory to allow the class to be used by the plurality of runtime systems, wherein access to the shared loader by the plurality of runtime systems is restricted to receive a set of parameters providing a declarative description of the shared class loader via a declarative interface; and return a reference to the shared class loader, the declarative interface to further
      prevent each of the plurality of runtime systems from using their own shared loader or from specifying an application code to be used in the shared loader, and guarantee the class is loaded consistently in each of the plurality of runtime systems; and
   invoking the shared loader to load executable code to be shared by the runtime systems, the executable code to include a shared portion and a local portion wherein
      the shared portion of the executable code is stored in the shared memory, and
      the local portion of the executable code is stored in a local memory of a runtime system invoking the shared load.

10. The method of claim 9, further comprising invoking a shared loader service with a declarative description of the shared loader.

11. The method of claim 9, wherein the executable code to be shared comprises a system code or the application code.

12. The method of claim 9, wherein the runtime systems comprise one or more of Java virtual machines and Common Language Runtime (CLR) virtual machines.

13. The method of claim 9, wherein the executable code comprises a class.

14. The method of claim 9, further comprising creating a shared closure in the shared memory, the shared closure comprising:
   a first object and a transitive closure of additional objects referenced by the first object, wherein at least one of the objects is an instance of the class being shared by the runtime systems; and
   the shared portion of the class being shared by the runtime systems.

15. The method of claim 9, wherein the shared portion of the executable code in the shared memory includes generated machine code.

16. The method of claim 9, wherein the generated machine code comprises platform-specific machine code generated by a compiler.

17. A system comprising:
   a server having a processing and a memory coupled to the processor, the memory having a shared memory, the server to:
   create a shared loader accessible by a plurality of runtime systems in a shared memory, the shared loader to have a runtime representation of a class loaded in the shared memory to allow the class to be used by the plurality of runtime systems, wherein access to the shared loader by the plurality of runtime systems is restricted to receive a set of parameters providing a declarative description of the shared class loader via a declarative interface, and return a reference to the shared class loader, the declarative interface to further
   prevent each of the plurality of runtime systems from using their own shared loader or from specifying an application code to be used in the shared loader, and
   guarantee the class is loaded consistently in each of the plurality of runtime systems, and
   invoke the shared loader to load executable code to be shared by the runtime systems, the executable code to include a shared portion and a local portion wherein the shared portion of the executable code is stored in the shared memory, and the local portion of the executable code is stored in a local memory of a runtime system invoking the shared load.

18. The system of claim 17, wherein the server is further to invoke a shared loader service with a declarative description of the shared loader.

19. The system of claim 17, wherein the executable code to be shared is a system code or the application code.

20. The system of claim 17, wherein the runtime systems comprise one or more of Java virtual machines and Common Language Runtime (CLR) virtual machines.

21. The system of claim 17, wherein the executable code comprises a class.

22. The system of claim 17, wherein the sever is further to create a shared closure in the shared memory, the shared closure comprising:
   a first object and a transitive closure of additional objects referenced by the first object, wherein at least one of the objects is an instance of the class being shared by the runtime systems; and
   the shared portion of the class being shared by the runtime systems.

23. The system of claim 17, wherein the shared portion of the executable code in the shared memory includes generated machine code.

24. The system of claim 17, wherein the generated machine code comprises platform-specific machine code generated by a compiler.

* * * * *

UNITED STATES PATENT AND TRADEMARK OFFICE
CERTIFICATE OF CORRECTION

PATENT NO. : 7,614,045 B2
APPLICATION NO. : 10/949936
DATED : November 3, 2009
INVENTOR(S) : Kuck et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fourteenth Day of December, 2010

David J. Kappos
*Director of the United States Patent and Trademark Office*